United States Patent
Lin et al.

(10) Patent No.: US 12,328,681 B2
(45) Date of Patent: Jun. 10, 2025

(54) METHOD FOR MULTIPLEXING OF SERVICES WITH DIFFERENT PRIORITY LEVELS

(71) Applicant: ZTE CORPORATION, Guangdong (CN)

(72) Inventors: Wei Lin, Shenzhen (CN); Li Tian, Shenzhen (CN); Yajun Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 326 days.

(21) Appl. No.: 17/887,121

(22) Filed: Aug. 12, 2022

(65) Prior Publication Data

US 2023/0058838 A1   Feb. 23, 2023

Related U.S. Application Data

(63) Continuation of application No. PCT/CN2020/075399, filed on Feb. 14, 2020.

(51) Int. Cl.
*H04W 52/32* (2009.01)
*H04L 1/16* (2023.01)
*H04L 1/1607* (2023.01)
*H04W 52/36* (2009.01)

(52) U.S. Cl.
CPC ......... *H04W 52/325* (2013.01); *H04L 1/1671* (2013.01); *H04W 52/367* (2013.01)

(58) Field of Classification Search
CPC ............. H04W 52/325; H04W 52/367; H04W 52/0238; H04W 52/281; H04W 52/34; H04W 52/38; H04W 52/50; H04W 72/231; H04W 72/232; H04W 72/0446; H04W 16/14; H04L 1/1671; Y02D 30/70
See application file for complete search history.

(56) References Cited

U.S. PATENT DOCUMENTS

| | | | |
|---|---|---|---|
| 2016/0105897 A1* | 4/2016 | Liu | H04W 72/54 370/235 |
| 2016/0338079 A1* | 11/2016 | Yeh | H04W 72/56 |
| 2017/0339719 A1 | 11/2017 | Xu et al. | |
| 2018/0007708 A1* | 1/2018 | Ke | H04W 24/00 |
| 2019/0223255 A1 | 7/2019 | Jeon et al. | |
| 2020/0021403 A1* | 1/2020 | Zheng | H04L 1/08 |
| 2020/0236556 A1* | 7/2020 | Eckert | H04L 67/12 |
| 2020/0413349 A1* | 12/2020 | Wilhelmsson | H04W 24/08 |
| 2021/0185734 A1* | 6/2021 | Li | H04W 74/0833 |

(Continued)

FOREIGN PATENT DOCUMENTS

| | | |
|---|---|---|
| CN | 110226348 A | 9/2019 |
| CN | 110536432 A | 12/2019 |
| CN | 110611959 A | 12/2019 |

(Continued)

OTHER PUBLICATIONS

WO 2018/204136 A1 (Year: 2018).*

(Continued)

*Primary Examiner* — Rasheed Gidado
(74) *Attorney, Agent, or Firm* — Foley & Lardner LLP

(57) ABSTRACT

A wireless communication method for use in a wireless device. The wireless communication method comprises transmitting data in a first period and performing a first operation in a second period which is within the first period.

16 Claims, 3 Drawing Sheets

(56) References Cited

U.S. PATENT DOCUMENTS

2021/0410187 A1    12/2021    Yang et al.

FOREIGN PATENT DOCUMENTS

| WO | WO-2017/035887 A1 | 3/2017 |
|----|-------------------|--------|
| WO | WO-2018/204136 A1 | 11/2018 |

OTHER PUBLICATIONS

International Search Report and Written Opinion for PCT Appl. No. PCT/CN2020/075399, mailed Oct. 30, 2020 (8 pages).

MCC Support, "Draft Report of 3GPP TSG RAN WG1 #99 V.0.1.0 (Reno, USE, Nov. 18-22, 2019)" 3GPP TSG RAN WG1 Meeting #100, R1-20xxxxx, Feb. 28, 2020, Athens, Greece (153 pages).

OPPO, "Summary #3 on UCI enhancements for URLLC" 3GPP TSG RAN WG1 #98bis, R1-1911691, Oct. 20, 2019, Chongqing, China (17 pages).

ETSI EN 301 893, V2.1.29, "5 GHz RLAN; Harmonised Standard covering the essential requirements of article 3.2 of Directive 2014/53/EU", ETSI, 650 Route des Lucioles, F-06921 Sophia Antipolis Cedex, France, Jan. 2020 (157 pages).

Extended European Search Report on EP Appl. No. 20891409.3, dated Sep. 12, 2023 (15 pages).

First Office Action for CN Appl. No. 202080092549.1, dated Jul. 25, 2024 (with English translation, 22 pages).

Qualcomm Incorporated, "Sidelink Resource Allocation Mechanism for NR V2X", 3GPP TSG RAN WG1 Meeting #95, R1-1813434, Nov. 16, 2018, Spokane, USA (9 pages).

* cited by examiner

METHOD FOR MULTIPLEXING OF SERVICES WITH DIFFERENT PRIORITY LEVELS

CROSS-REFERENCE TO RELATED PATENT APPLICATIONS

This application claims the benefit of priority under 35 U.S.C. § 120 as a Continuation of US Application PCT/CN2020/075399, filed Feb. 14, 2020, incorporated herein by reference in its entirety.

BACKGROUND

This document is directed generally to wireless communications.

A first stage of standard setting for the 5th Generation mobile communication technology (5G, which also called as new radio (NR)) has been done. According to a trend of the standard setting and technology development, the 5G system makes endeavor to research technical targets such as faster speed (Gbps), massive links (1 M/Km$^2$), ultra low latency, higher reliability, and hundred times power efficiency, so as to support variations on new requirements. In the NR, an NR-based access to unlicensed spectrum (NR-U) technology is believe to have a huge application prospect on internet of thing (IoT), factory automation, . . . , etc. However, the NR-U technology still has many unresolved issues needing to be discussed.

This document relates to methods, systems, and devices for multiplexing of services with different priority levels.

SUMMARY

The present disclosure relates to a wireless communication method for use in a wireless device. The wireless communication method comprising:

transmitting data in a first period, and performing a first operation in a second period which is within the first period.

Various embodiments may preferably implement the following features:

Preferably, the first operation comprises reducing a power of transmitting the data in the second period.

Preferably, the first operation comprises stopping transmitting the data in the second period.

Preferably, the data in the second period is delayed.

Preferably, the data in the second period is punctured.

Preferably, the wireless communication method further comprises:

sensing a first power in a channel, in which the data is transmitted, in a third period which is after the second period and within the first period, and performing a second operation in a fourth period, which is after the third period and within the first period, based on the first power.

Preferably, the first power is not greater than a first threshold and the second operation comprises transmitting the data in the fourth period by a power of transmitting the data before the second period.

Preferably, the first power is greater than a first threshold and is not greater than a second threshold and the second operation comprises transmitting the data by a reduced transmitting power in the fourth period.

Preferably, the wireless communication method further comprises:

sensing a second power in the channel in a fifth period, which is after the fourth period and is within the first period, and performing a third operation in a sixth period, which is after the fifth period and is within the first period, based on the second power.

Preferably, a time delay between the third period and the fifth period is configured by a radio resource control, RRC, signaling, indicated by downlink control information, DCI, or set as a default value.

Preferably, the second power is greater than the first threshold and is not greater than the second threshold and the third operation comprises:

transmitting the data in the sixth period in the reduced power, sensing a third power in the channel in a seventh period, which is after the sixth period and is within the first period, and performing a fourth operation in an eighth period, which is after the seventh period and is within the first period, based on the third power.

Preferably, the second power is not greater than the first threshold and the third operation comprises transmitting the data in the sixth period by a power of transmitting the data before the second period.

Preferably, the first power is greater than a first threshold and the second operation comprises stopping transmitting the data in the fourth period.

Preferably, the wireless communication method further comprises:

sensing a fourth power in the channel in a ninth period, which is after the third period and is within the first period, and performing a fifth operation in a tenth period, which is after the ninth period and is within the first period, based on the fourth power.

Preferably, a time delay between the third period and the ninth period is configured by an RRC signaling or indicated by DCI.

Preferably, the fourth power is greater than the first threshold and the fifth operation comprises:

stopping transmitting the data in the tenth period, sensing a fifth in the channel power in an eleventh period, which is after the tenth period and is within the first period, and performing a sixth operation in a twelfth period, which is after the eleventh period and is within the first period, based on the fifth power.

Preferably, the fourth power is not greater than the first threshold and the fifth operation comprises transmitting the data in the tenth period.

Preferably, the first period is a channel occupancy time within a fixed frame period.

Preferably, the first period is before an idle period within a fixed frame period.

Preferably, the data is for a low priority service.

Preferably, a time latency requirement of the low priority service is greater than a time latency requirement of a high priority service.

Preferably, a reliability requirement of the low priority service is lower than a reliability requirement of a high priority service.

Preferably, a priority level of the low priority service is lower than a priority level of a high priority service.

Preferably, the high priority service is associated with ultra-reliable and low latency communications.

Preferably, the low priority service is associated with enhanced mobile broadband.

Preferably, the second period overlaps an idle period of a fixed frame period configured for another wireless device.

Preferably, the another wireless device is for a high priority service.

Preferably, wherein the wireless device is a user equipment or a base station.

The present disclosure relates to a wireless communication method for use in a wireless device. The wireless communication method comprises:

sensing a power in a channel in an idle period, and
performing an operation based on relationships among the sensed power, a first threshold and a second threshold.

Various embodiments may preferably implement the following features:

Preferably, the sensed power is not greater than the first threshold and the operation comprises transmitting data in an occupation period after the idle period.

Preferably, the sensed power is greater than the first threshold and is not greater than the second threshold and the operation comprises transmitting data in an occupation period after the idle period by a normal transmitting power or an increased transmitting power higher than the normal transmitting predefined power.

Preferably, the second threshold is greater than the first threshold, the sensed power is greater than the second threshold and the operation comprises not transmitting data in an occupation period after the idle period.

Preferably, the second threshold is greater than the first threshold, the sensed power is greater than the first threshold and the operation comprises not transmitting data in an occupation period after the idle period.

Preferably, the occupation period is a channel occupancy time within a fixed frame period next to a fixed frame period of the idle period.

Preferably, the data is for a high priority service.

Preferably, a time latency requirement of the high priority service is smaller than a time latency requirement of a low priority service.

Preferably, a reliability requirement of the high priority service is higher than a reliability requirement of a low priority service.

Preferably, a priority of the high priority service is higher than a priority of a low priority service.

Preferably, the low priority service is associated with enhanced mobile broadband.

Preferably, the high priority service is associated with ultra-reliable and low latency communications.

Preferably, the idle period overlaps an occupation period of a fixed frame period configured for another wireless device.

Preferably, the another wireless device is for a low priority service.

Preferably, the wireless device is a user equipment or a base station.

The present disclosure relates to a wireless device, comprising:

a communication unit, configured to transmit data in a first period, and
a processor configured to perform a first operation in a second period which is within the first period.

Various embodiments may preferably implement the following feature:

Preferably, the processor is further configured to perform a wireless communication method of any of the foregoing described methods.

The present disclosure relates to a wireless device, comprising a processor configured to sense a power on a channel in an idle period and to perform an operation based on relationships among the sensed power, a first threshold and a second threshold.

Various embodiments may preferably implement the following feature:

Preferably, the processor is further configured to perform a wireless communication method of any of the foregoing described methods.

The present disclosure relates to a computer program product comprising a computer-readable program medium code stored thereupon, the code, when executed by a processor, causing the processor to implement a method of any of the foregoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

DETAILED DESCRIPTION

Figure 1:
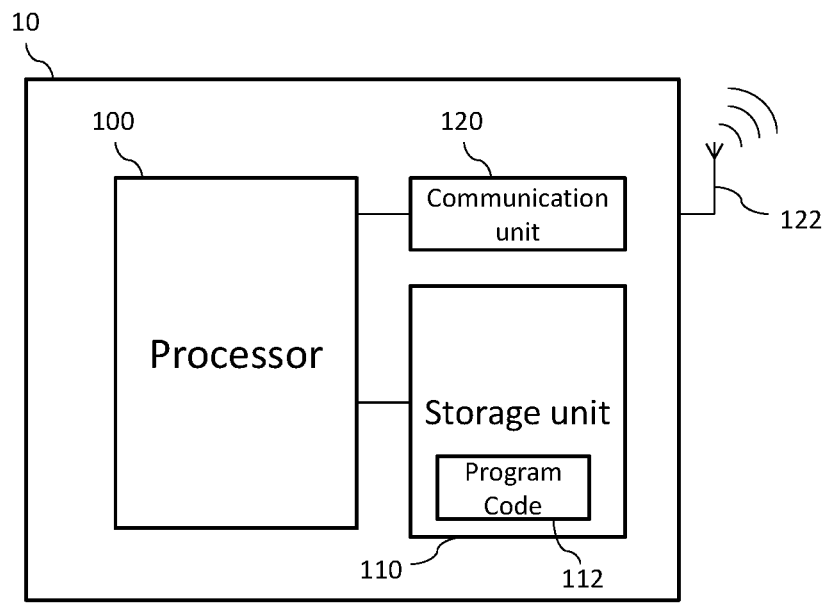
FIG. 1 shows an example of a schematic diagram of a wireless terminal according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

In an embodiment, the storage unit 110 and the program code 112 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
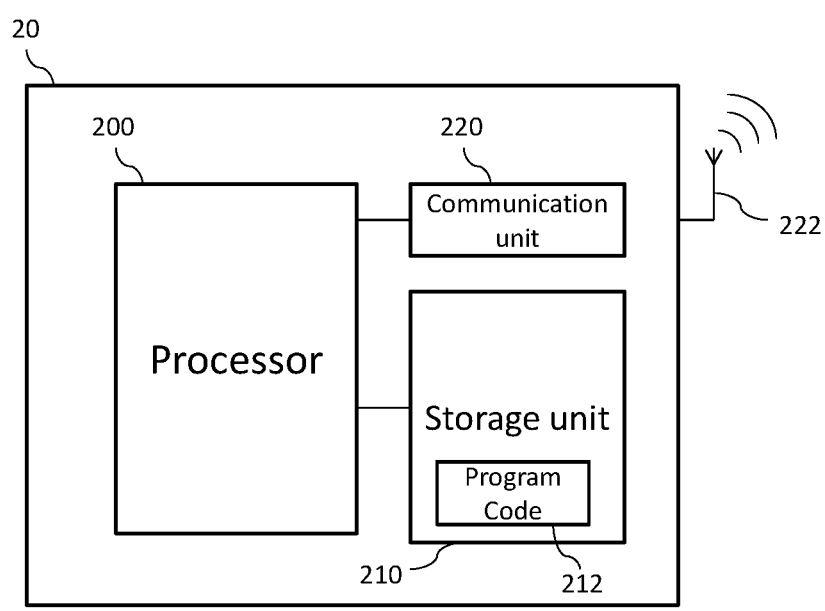
FIG. 2 shows an example of a schematic diagram of a wireless network node according to an embodiment of the present disclosure.

FIG. 2 relates to a schematic diagram of a wireless network node 20 according to an embodiment of the present disclosure. The wireless network node 20 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment).

In this disclosure, a device may be equal to a wireless device, a wireless terminal, a UE, a wireless network node or a BS, and is not limited herein.

In this disclosure, a high priority service device may be equal to a high priority service or a device performing (e.g. transmitting) the high priority service.

In this disclosure, a low priority service device may be equal to a low priority service or a device performing (e.g. transmitting) the low priority service.

In this disclosure, a frequency may be equal to a channel, a carrier, a carrier frequency or a frequency band.

In this disclosure, a period may be equal to a slot, at least one slot or multiple slots.

In this disclosure, a priority may be equal to a priority level.

Regarding to utilizing the NR-U technology, there are certain rules need to be followed. For example, before a device (e.g. a BS or a UE) uses a channel in the unlicensed spectrum for transmitting data, the device is required to perform a clear channel assessment (CCA), which is also called listen before talk (LBT). In an embodiment, the device performs the CCA on a channel (i.e. frequency band) by sensing (e.g. determining, acquiring, obtaining or detecting) a power in the channel. Only the device successfully performs the CCA (e.g. the sensed power is smaller than a threshold) is able to occupy the channel in the unlicensed spectrum for transmitting the data. A frame based equipment (FBE) mode comprises a fixed frame period (FFP) which comprises a channel occupancy time (COT) and an idle period. When the device successfully performs the CCA in the idle period, the device is allowed to occupy the channel in the COT of next FFP. Otherwise, the device needs to wait and performs the CCA again in the idle period of next FFP. The FBE mode may be also called semi-persistent channel access mode, wherein a channel access procedure period of the semi-persistent channel access mode is the same with the FFP. Thus, the present disclosure utilizes the FBE mode and parameters of the FBE mode in the following for simplifying illustrations.

In an embodiment, services with different priority levels may have different requirements. For example, the services may be classified into a high priority service or a low priority service, wherein a priority level of the high priority service is higher than that of the low priority service. In an embodiment, the high priority service may have a latency requirement higher than that of the low priority service (i.e. the latency required by the high priority service is smaller than that required by the low priority service). In an embodiment, the high priority service may have a reliability requirement higher than that of the low priority service (i.e. the reliability required by the high priority service is higher than that required by the low priority service). In an embodiment, the high priority service is associated with ultra-reliable and low latency communications (URLLC). In an embodiment, the low priority service is associated with enhanced mobile broadband (eMBB).

In an embodiment, the high priority service may need to occupy channel resources of a low priority service for transmitting data of the high priority service, so as to achieve its higher requirements (e.g. smaller latency and/or higher reliability). The present disclosure provides various proposals on multiplexing of the high priority service and the low priority service in the unlicensed spectrum and related operations of corresponding CCA.

Embodiment 1

In an embodiment, when an NR-U device (e.g. a BS or a UE) works in the FBE mode, data of the high priority service (hereinafter, high priority service data) and data of the low priority service (hereinafter, low priority service data) may be transmitted in the same frequency band (e.g. the frequency band in the unlicensed spectrum). Under such a condition, a multiplexing of the high priority service and the low priority service is needed for data transmissions on the frequency band. In an embodiment, the frequency band is the minimum unit of the frequency domain bandwidth for performing the CCA. In an embodiment, the higher priority service is different from the low priority service in at least one of:

a latency required by the high priority service is smaller than a latency required by the low priority service, a reliability required by the high priority service is higher than a reliability required by the low priority service, or a priority level of the high priority service is higher than a priority level of the low priority service.

In an embodiment, the high priority service is associated with the URLLC.

In an embodiment, the low priority service is associated with the eMBB.

Under the FBE mode, when a device successfully performs the CCA in an idle period of a previous FFP, the device is able (e.g. allowed) to utilize a COT of a current FFP to transmit data. In an embodiment, a FFP of the high priority service device (hereinafter, HP-FFP) may be smaller than a FFP of the low priority service device (LP-FFP). Under such a condition, the COT of the LP-FFP may overlap with the idle period of the HP-FFP. When the low priority service device transmits low priority service data in the period where the COT of the LP-FFP overlaps the idle period of the HP-FFP (hereinafter, overlapped period), the CCA performed by the high priority service device may fail. That is, the high priority service device detects (e.g. senses or determines) that the frequency band is occupied and cannot transmit data in the COT of next HP-FFP. As a result, the requirements of the high priority service may not be achieved.

In an embodiment, in order to achieve the requirements of the high priority service, the low priority service device may reduce a power of transmitting the low priority service data in the overlapped period (e.g. reduced from a normal transmitting power to a reduced transmitting power). In this embodiment, the high priority service device and the low priority service device utilizes the same frequency band (e.g. the frequency band in the unlicensed spectrum) for transmitting data. In an embodiment, the high priority service device performs the CCA in the idle period and performs one of the following operations:

the CCA sensed value (e.g. the sensed power in the frequency band) is not greater than a threshold TH1 and the high priority service device transmits the high priority service data in the COT of the next HP-FFP by the normal transmitting power;

the CCA sensed value is greater than the threshold TH1 and is not greater than a threshold TH2 and the high priority service device transmits the high priority service data in the COT of the next HP-FFP by the normal transmitting power or an increased transmitting power which is greater than the normal transmitting power; or the CCA sensed value is greater than the threshold TH2 and the high priority service device does not transmit the high priority service data in the COT of the next HP-FFP.

In an embodiment, the threshold TH1 is a threshold of the CCA determining whether the channel is idle (e.g. a threshold for a device considering (e.g. determining) whether the channel is idle and whether the device is able to transmit data in the channel).

In an embodiment, the threshold TH2 is a threshold of the CCA determining whether the channel is idle under a multiplexing condition. In an embodiment of the high priority service device and the low priority service device utilize the same channel for transmitting data (i.e. the multiplexing condition), the threshold TH2 may be a threshold of that the high priority service device is able to transmit the high priority service data in the channel (either by the normal transmitting power or the increased power) when the low priority service device transmits the low priority service data in the channel by the reduced power.

In an embodiment, when the CCA sensed value is not greater than the threshold TH1, there may be not device transmitting data in the channel sensed by the CCA.

In an embodiment, when the CCA sensed value is greater than the threshold TH1 and is not greater than the threshold TH2, there may be a device (e.g. low priority service device) transmitting data in the channel, on which the CCA is performed, by the reduced transmitting power. In this embodiment, the channel in which a device transmits the data may be multiplexed for transmitting data of another device.

In an embodiment, when the CCA sensed value is greater than the threshold TH2, the channel on which the CCA is performed may not be used for transmitting data of additional devices.

In an embodiment, the low priority service device performs the CCA in a period after (e.g. right after) the overlapped period and performs at least one of the following operations 1.1 or 1.2 based on the CCA sensed value:

1.1: The CCA sensed value is not greater than the threshold TH1 (i.e. the high priority service device does not transmit the high priority service data in the channel) and the low priority service device transmits the low priority service data by a normal transmitting power (i.e. the power of transmitting the low priority service data is increased from the reduced transmitting power to the normal transmitting power) in the remaining COT.

1.2: The CCA sensed value is greater than the threshold TH1 and is not greater than the threshold TH2 (i.e. the high priority service device transmits the high priority service data in the sensed channel) and the low priority service device may perform one of the following operations 1.2.1, 1.2.2 or 1.2.3:

1.2.1: In the channel, the low priority service device keeps transmitting the low priority service data by the reduced transmitting power and performs the CCA again after a time delay. In an embodiment, the time delay is designed to make a period of performing the later CCA is still within the COT of the current LP-FFP. When the CCA sensed value of the later performed CCA is not greater than the threshold TH1 (e.g. the high priority service device may finish transmitting the high priority service data), the low priority service device transmits the low priority service data in the channel by the normal transmitting power (i.e. the power of transmitting the low priority service data is recovered back from the reduced transmitting power to the normal transmitting power) in the remaining COT. When the CCA sensed value of the later performed CCA is greater than the threshold TH1 and is not greater than the threshold TH2, the low priority service device performs the operation 1.2.1 again. In this embodiment, the time delay may be configured by a radio resource control (RRC) signaling, indicated by downlink (DL) control information (DCI) or set as a default value.

1.2.2: In the channel, the low priority service device stops transmitting the low priority service data and performs the CCA again after the time delay. Note that a period of performing the later CCA is still within the COT of the current LP-FFP. When the CCA sensed value of the later performed CCA is not greater than the threshold TH1, the low priority service device transmits the low priority service data in the channel by the normal transmitting power. When the CCA sensed value of the later performed CCA is greater than the threshold TH1 and is not greater than the threshold TH2, the low priority service device performs the operation 1.2.2 again. In this embodiment, the time delay may be configured by an RRC signaling, indicated by DCI or set as a default value.

1.2.3: The low priority service device stops transmitting the low priority service data in the remaining COT of the current LP-FFP and waits till the idle period of next LP-FFP to perform the CCA.

Figure 3:
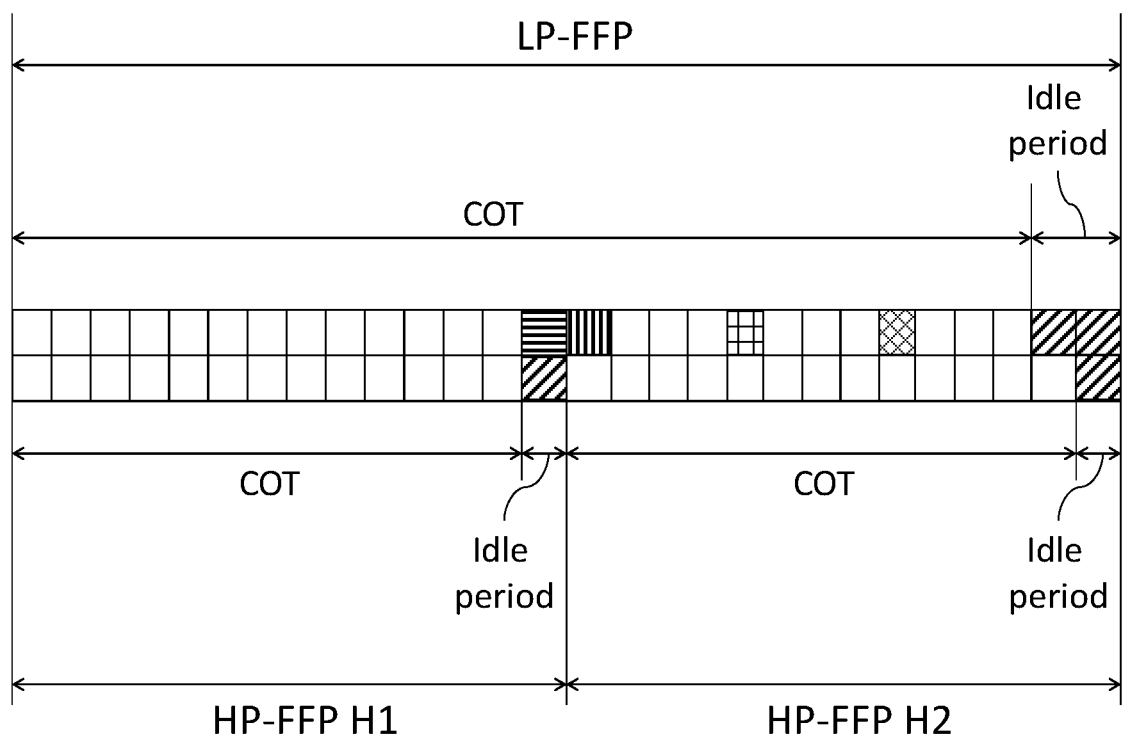
FIG. 3 shows an example of multiplexing services with different priority levels according to an embodiment of the present disclosure.

FIG. 3 shows an example of the high priority service device and the low priority service device use the same channel for transmitting data according to an embodiment of the present disclosure. In FIG. 3, the LP-FFP is doubled the HP-FFP (e.g. the HP-FFP is 1 ms and the LP-FFP is 2 ms). In addition, the idle periods of the LP-FFP and the HP-FFPs H1 and H2 are slots with slashed stripes. As shown in FIG. 3, the COT of the LP-FFP overlaps with the idle period of the HP-FFP H1 at a slot with horizontal stripes. In an embodiment, the low priority service device transmits the low priority service data in the COT of the LP-FFP and this low priority service device reduces the power of transmitting the low priority service data in the overlapped period (i.e. the slot with horizontal lines). In this embodiment, a high priority service device wants to transmit the high priority service data in the COT of the HP-FFP H2 and performs the CCA in the idle period of the HP-FFP H1. When the CCA sensed value is not greater than the threshold TH1, the high priority service device transmits the high priority service data in the COT of the HP-FFP H2. When the CCA sensed value is greater than the threshold TH1 and is not greater than the threshold TH2, the high priority service device transmits the high priority service data by the normal transmitting power or the increased transmitting power which is greater than the normal transmitting power. When the CCA sensed value is greater than the threshold TH2, the high priority service device does not transmit the high priority service data in the COT of the HP-FFP H2.

In addition, the low priority service device performs the CCA at a period right after (i.e. next to) the overlapped period (i.e. the slot with vertical stripes which is next to the slot with horizontal stripes). When the CCA sensed value is not greater than the threshold TH1 (i.e. no high priority service device uses the channel), the low priority service device transmits the low priority service data by the normal transmitting power in the remaining COT of the LP-FFP. When the CCA sensed value is greater than the threshold TH1 and is not greater than the threshold TH2, the low priority service device may perform one of the operations 1.2.1, 1.2.2 or 1.2.3.

For example, the low priority service device may perform the operation 1.2.1 when the CCA sensed value of the CCA performed in the slot with vertical stripes is greater than the threshold TH1 and is not greater than the threshold TH2. That is, the low priority service device keeps transmitting the low priority service data in the channel by the reduced transmitting power and performs the CCA again after a time delay. In this embodiment, the low priority service device may perform the CCA again in the slot with block check. That is, in this embodiment, the time delay is 3 slots and the low priority service device transmits the low priority service data in the 3 slots between the slot with vertical stripes and the slot with block check by the reduced transmitting power.

In an embodiment, the CCA sensed value of the CCA performed in the slot with block check is not greater than the threshold TH1 (i.e. the high priority service device finishes transmitting the high priority service device data) and the low priority service device transmits the low priority service data by the normal transmitting power in the remaining COT. In an embodiment, the CCA sensed value of the CCA performed in the slot with block check is greater than the threshold TH1 and is not greater than the threshold TH2, the low priority service device transmits the low priority service data in the next 3 slots and performs the CCA again in the slot with diamond check, and so on.

Note that, the CCA(s) performed after the overlapped period is within the COT of the current LP-FFP. When a period of performing a CCA is after (or overlaps) the idle period of the current LP-FFP, the low priority service device does not perform this CCA.

Embodiment 2

When an NR-U device (e.g. a BS or a UE) works in the FBE mode, data of the high priority service (hereinafter, high priority service data) and data of the low priority service (hereinafter, low priority service data) may be transmitted in the same frequency band (e.g. the frequency band in the unlicensed spectrum). Under such a condition, a multiplexing of the high priority service and the low priority service is needed for data transmissions on the frequency band. In an embodiment, the frequency band is the minimum unit of the frequency domain bandwidth for performing the CCA. In an embodiment, the higher priority service is different from the low priority service in at least one of:

a latency required by the high priority service is smaller than a latency required by the low priority service, a reliability required by the high priority service is higher than a reliability required by the low priority service, or a priority level of the high priority service is higher than a priority level of the low priority service.

In an embodiment, the high priority service is associated with the URLLC.

In an embodiment, the low priority service is associated with the eMBB.

Under the FBE mode, when a device successfully performs the CCA in an idle period of a previous FFP, the device is able to utilize a COT of a current FFP to transmit data. In an embodiment, a FFP of the high priority service device (hereinafter, HP-FFP) may be smaller than a FFP of the low priority service device (LP-FFP). Under such a condition, the COT of the LP-FFP may overlap with the idle period of the HP-FFP. When the low priority service device transmits low priority service data in the period where the COT of the LP-FFP overlaps the idle period of the HP-FFP (hereinafter, overlapped period), the CCA performed by the high priority service device may fail. That is, the high priority service device detects (e.g. senses or determines) that the frequency band is occupied and cannot transmit data in the COT of next HP-FFP. As a result, the requirements of the high priority service may not be achieved.

In an embodiment of the high priority service device and the low priority service device utilizing the same frequency band (e.g. the frequency band in the unlicensed spectrum) for transmitting data, the low priority service device may delay the transmission of low priority service data in the overlapped period, so as to achieve the requirements of the high priority service. That is, the low priority service device does not transmit the low priority service data in the overlapped period. In this embodiment, the data in the overlapped period is delayed. In an embodiment, the high priority service device performs the CCA in the idle period and performs one of the following operations:

the CCA sensed value (e.g. the sensed power in the frequency band) is not greater than the threshold TH1 and the high priority service device occupies the COT of next HP-FFP for transmitting the high priority service data; or the CCA sensed value is greater than the threshold TH1, the CCA performed by the high priority service device fails and the high priority service device does not transmit the high priority service data in the COT of the next HP-FFP.

In an embodiment, the low priority service device performs the CCA in a period after (e.g. right after) the overlapped period and performs one of the following operations 2.1 or 2.2 based on the CCA sensed value:

2.1: The CCA sensed value is not greater than the threshold TH1 (i.e. the high priority service device does not transmit the high priority service data in the channel) and the low priority service device transmits the low priority service data in the remaining COT.

2.2: The CCA sensed value is greater than the threshold TH1 (i.e. the high priority service device transmits the high priority service data in the sensed channel) and the low priority service device may perform one of the following operations 2.2.1 or 2.2.2:

2.2.1: In the channel, the low priority service device stops transmitting the low priority service data and performs the CCA after a time delay. In an embodiment, the time delay is designed to make a period of performing the later CCA is still within the COT of the current LP-FFP. When the CCA sensed value of the later performed CCA is not greater than the threshold TH1, the low priority service device continues to transmit the low priority service data in the channel in the remaining COT. When the CCA sensed value of the later performed CCA is greater than the threshold TH1, the low priority service device performs the operation 2.2.1 again. In this embodiment, the time delay may be configured by an RRC signaling, indicated by DCI or set as a default value.

2.2.2: The low priority service device stops transmitting the low priority service data in the remaining COT of the current LP-FFP and waits till the idle period of next LP-FFP to perform the CCA.

Figure 4:
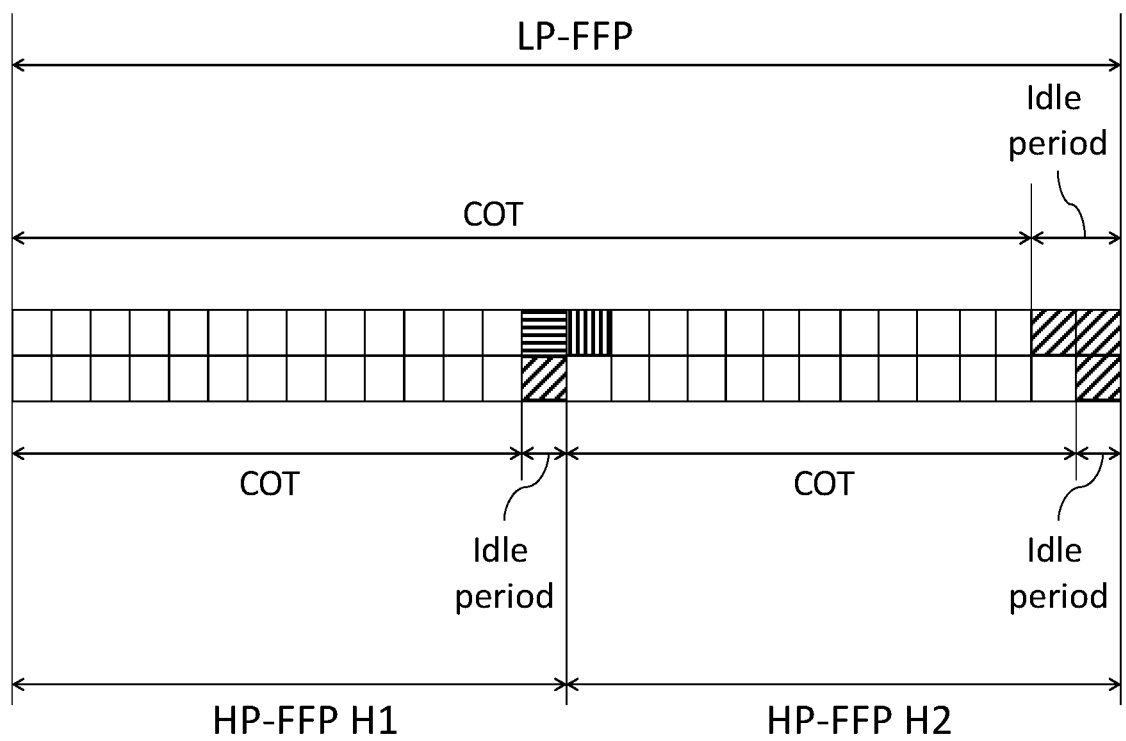
FIG. 4 shows an example of multiplexing services with different priority levels according to an embodiment of the present disclosure.

FIG. 4 shows an example of the high priority service device and the low priority service device use the same channel for transmitting data according to an embodiment of the present disclosure. In FIG. 4, the LP-FFP is doubled the HP-FFP (e.g. the HP-FFP is 1 ms and the LP-FFP is 2 ms). In addition, the idle periods of the LP-FFP and the HP-FFPs H1 and H2 are slots with slashed stripes. As shown in FIG. 4, the COT of the LP-FFP overlaps with the idle period of the HP-FFP H1 at a slot with horizontal stripes.

In an embodiment of FIG. 4, the low priority service device transmits the low priority service data in the COT of the LP-FFP and this low priority service device delays the data transmission in the overlapped period (i.e. stops transmitting the low priority service data in the overlapped period). In this embodiment, a high priority service device wants to transmit the high priority service data in the COT of the HP-FFP H2 and performs the CCA in the idle period of the HP-FFP H1. When the CCA sensed value is not greater than the threshold TH1, the high priority service device transmits the high priority service data in the COT of the HP-FFP H2. When the CCA sensed value is greater than the threshold TH1, the high priority service device does not transmit the high priority service data in the COT of the HP-FFP H2.

In an embodiment, the low priority service device performs the CCA at a period right after (i.e. next to) the overlapped period (i.e. the slot with vertical stripes which is next to the slot with horizontal stripes). When the CCA sensed value is not greater than the threshold TH1 (i.e. no high priority service device uses the channel), the low priority service device continues to transmit the low priority service data after the CCA. In an embodiment, when the CCA sensed value is greater than the threshold TH1, the low priority service device may perform the operation 2.2.2. That is, the low priority service device stops transmitting the low priority service data in the remaining COT of the LP-FFP (i.e. the slots between the slot with the vertical stripes and the idle period of the LP-FFP) and waits till the idle period of the LP-FFP to perform the CCA.

Embodiment 3

When an NR-U device (e.g. a BS or a UE) works in the FBE mode, data of the high priority service (hereinafter, high priority service data) and data of the low priority service (hereinafter, low priority service data) may be transmitted in the same frequency band (e.g. in the unlicensed spectrum). Under such a condition, a multiplexing of the high priority service and the low priority service is needed for data transmissions on the frequency band. In an embodiment, the frequency band is the minimum unit of the frequency domain bandwidth for performing the CCA. In an embodiment, the higher priority service is different from the low priority service in at least one of:

a latency required by the high priority service is smaller than a latency required by the low priority service, a reliability required by the high priority service is higher than a reliability required by the low priority service, or a priority level of the high priority service is higher than a priority level of the low priority service.

In an embodiment, the high priority service is associated with the URLLC.

In an embodiment, the low is associated with the eMBB.

Under the FBE mode, when a device successfully performs the CCA in an idle period of a previous FFP, the device is able to utilize a COT of a current FFP to transmit data. In an embodiment, a FFP of the high priority service device (hereinafter, HP-FFP) may be smaller than a FFP of the low priority service device (LP-FFP). Under such a condition, the COT of the LP-FFP may overlap with the idle period of the HP-FFP. When the low priority service device transmits low priority service data in the period where the COT of the LP-FFP overlaps the idle period of the HP-FFP (hereinafter, overlapped period), the CCA performed by the high priority service device may fail. That is, the high priority service device detects (e.g. senses or determines) that the target frequency band is occupied and cannot transmit data in the COT of next HP-FFP. As a result, the requirements of the high priority service may not be achieved.

In an embodiment of the high priority service device and the low priority service device utilizing the same frequency band (e.g. the frequency band in the unlicensed spectrum) for transmitting data, the low priority service device may puncture the transmission of low priority service data in the overlapped period, so as to achieve the requirements of the high priority service. That is, the low priority service device drops (e.g. punctures or discards) the data originally configured in the overlapped period. In an embodiment, the high priority service device performs the CCA in the idle period and performs one of the following operations:

the CCA sensed value (e.g. the sensed power in the frequency band) is not greater than the threshold TH1 and the high priority service device transmits high priority service data in the COT of the next HP-FFP by the normal transmitting power; or the CCA sensed value is greater than the threshold TH1, the CCA performed by the high priority service device fails and the high priority service device does not transmit the high priority service data in the COT of the next HP-FFP.

In an embodiment, the low priority service device performs the CCA in a period after (e.g. right after) the overlapped period and performs one of the following operations 3.1 or 3.2 based on the CCA sensed value:

3.1: The CCA sensed value is not greater than the threshold TH1 (i.e. there is not the high priority service device transmitting the high priority service data in the channel), the CCA performed by the low priority service device successes and the low priority service device transmits the low priority service data in the remaining COT.

3.2: The CCA sensed value is greater than the threshold TH1 (i.e. the high priority service device transmits the high priority service data in the channel), the low priority service device stops transmitting the low priority service data in the remaining COT and performs the CCA in next idle period.

In an embodiment under the FEB mode, the high priority service device and the low priority service device utilize the same frequency band to transmit data. In this embodiment, the COT of the low priority service device overlaps with the idle period of the high priority service and one of the following events S1, S2 or S3 may occur in the overlapped period:

S1: The low priority service device reduces a transmitting power in the overlapped period.

S2: The low priority service device delays the transmission of the low priority service data in the overlapped period.

S3: The low priority service device punctures the low priority service data in the overlapped period.

When the low priority service device performs the operation S1, the following event S1.1 may occur:

S1.1: When the low priority service device performs the operation S1, the high priority service device performs the CCA in the overlapped period. When the CCA sensed value is not greater than the threshold TH1, the high priority service device utilizes the normal transmitting power to transmit the high priority service data. When the CCA sensed value is greater than the threshold TH1 and is not greater than the threshold TH2, the high priority service device may utilize the normal transmitting power or the increased transmitting power to transmit the high priority service data. When the CCA sensed value is greater than the threshold TH2, the high priority service device does not transmit the high priority service data in the COT of next HP-FFP. In addition, one of the following events S1.1.1, S1.1.2 or S1.1.3 may occur:

S1.1.1: The low priority service device performs the CCA after (e.g. right after) the overlapped period, the CCA sensed value is not greater than the threshold TH1, and the low priority service device transmits the low priority service data by the normal transmitting power.

S1.1.2: The low priority service device performs the CCA after (e.g. right after) the overlapped period, the CCA sensed value is greater than the threshold TH1 and is not greater than the threshold TH2, and the following event S1.1.2.1 may occur:

S1.1.2.1: The low priority service device keeps transmitting the low priority service data by the reduced transmitting power and performs the CCA after a time delay. Note that, a period of performing the CCA in the operation S1.1.2.1 is within the COT of current LP-FFP. In addition, the time delay may be configured by an RRC signaling, indicated by DCI or set as a default value. Based on the CCA performed after the time delay, the following event S1.1.2.2 or S1.1.2.3 may occur.

S1.1.2.2: The CCA sensed value of the CCA performed after (e.g. right after) the time delay is greater than the threshold TH1 and is not greater than the threshold TH2, and the event S1.1.2.1 may occur again.

S1.1.2.3: The CCA sensed value of the CCA performed after (e.g. right after) the time delay is not greater than the threshold TH1 and the low priority service device transmits the low priority service data by the normal transmitting power.

S1.1.3: The low priority service device performs the CCA after (e.g. right after) the overlapped period, the CCA sensed value is greater than the threshold TH1 and the low priority service device stops transmitting the low priority service data and performs the CCA in next idle period.

When the low priority service device performs the operation S2, the following event S1.2 may occur:

S1.2: When the low priority service device performs the operation S2, the high priority service device performs the CCA in the overlapped period. When the CCA sensed value is not greater than the threshold TH1, the high priority service device occupies the COT of next HP-FFP to transmit the high priority service data. When the CCA sensed value is greater than the threshold TH1, the CCA performed by the high priority service device fails and the high priority service device cannot use the COT of next HP-FFP to transmit the high priority service data. In addition, one of the following events S1.2.1, S1.2.2 or S1.2.3 may occur:

S1.2.1: The low priority service device performs the CCA after (e.g. right after) the overlapped period, the CCA sensed value is not greater than the threshold TH1, and the low priority service device continues to transmit the low priority service data.

S1.2.2: The low priority service device performs the CCA after (e.g. right after) the overlapped period, the CCA sensed value is greater than the threshold TH1 and the following event S1.1.2.1 may occur:

S1.2.2.1: The low priority service device stops transmitting the low priority service data and performs the CCA after (e.g. right after) a time delay. Note that, a period of performing the CCA in the operation 51.2.2.1 is within the COT of current LP-FFP. In addition, the time delay may be configured by an RRC signaling, indicated by DCI or set as a default value. Based on the CCA performed after the time delay, the following event S1.2.2.2 or S1.2.2.3 may occur.

S1.2.2.2: The CCA sensed value of the CCA performed after (e.g. right after) the time delay is greater than the threshold TH1 and the event S1.1.2.1 may occur.

S1.2.2.3: The CCA sensed value of the CCA performed after (e.g. right after) the time delay is not greater than the threshold TH1 and the low priority service device continues to transmit the low priority service data.

S1.2.3: The low priority service device performs the CCA after (e.g. right after) the overlapped period, the CCA sensed value is greater than the threshold TH1 and the low priority service device stops transmitting the low priority service data in the remaining COT and performs the CCA in next idle period.

When the low priority service device performs the operation S3, the following event S1.3 may occur:

S1.3: When the low priority service device performs the operation S3, the high priority service device performs the CCA in the overlapped period. When the CCA sensed value is not greater than the threshold TH1, the high priority service device occupies the COT of next HP-FFP to transmit the high priority service data. When the CCA sensed value is greater than the threshold TH1, the CCA performed by the high priority service device fails and the high priority service device cannot use the COT of next HP-FFP to transmit the high priority service data. In addition, the following event S1.3.1 or S1.3.2 may occur:

S1.3.1: The low priority service device performs the CCA after (e.g. right after) the overlapped period, the CCA sensed value is not greater than the threshold TH1 (i.e. the CCA successes), and the low priority service device continues to transmit the low priority service data after the CCA successes.

S1.3.2: The low priority service device performs the CCA after (e.g. right after) the overlapped period, the CCA sensed value is greater than the threshold TH1 and the low priority service device stops transmitting the low priority service data in the remaining COT and waits next idle period to perform the CCA.

In the present disclosure exemplary reference is made to the 5th generation mobile communication system (5G). However it is understood by the skilled person that the present disclosure is not restricted to 5G but also covers other standards without departing from the present disclosure.

In the present disclosure exemplary reference is made to the unlicensed spectrum. However, it is understood by the skilled person that the present disclosure is not restricted to the unlicensed spectrum but also covers other spectrums (e.g. licensed spectrum) without departing from the present disclosure.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a wireless device, the wireless communication method comprising:
    transmitting data in a first period;
    performing a first operation in a second period which is within the first period;
    sensing a first power in a channel, in which the data is transmitted, in a third period which is after the second period and within the first period;
    performing a second operation in a fourth period, which is after the third period and within the first period, based on the first power, wherein the first power is greater than a first threshold and is not greater than a second threshold and the second operation comprises transmitting the data by a reduced transmitting power in the fourth period;
    sensing a second power in the channel in a fifth period, which is after the fourth period and is within the first period; and
    performing a third operation in a sixth period, which is after the fifth period and is within the first period, based on the second power,
    wherein a time delay between the third period and the fifth period is configured by a radio resource control (RRC) signaling, indicated by downlink control information (DCI) or set as a default value,
    wherein:
        the second power is greater than the first threshold and is not greater than the second threshold and the third operation comprises:
            transmitting the data in the sixth period in the reduced transmitting power,
            sensing a third power in the channel in a seventh period, which is after the sixth period and is within the first period, and
            performing a fourth operation in an eighth period, which is after the seventh period and is within the first period, based on the third power, or
        the second power is not greater than the first threshold and the third operation comprises transmitting the data in the sixth period by a power of transmitting the data before the second period.

2. The wireless communication method of claim 1, wherein the first operation comprises reducing a power of transmitting the data in the second period.

3. The wireless communication method of claim 1, wherein the first operation comprises stopping transmitting the data in the second period, wherein the data in the second period is delayed or punctured.

4. The wireless communication method of claim 1, wherein the first power is not greater than the first threshold and the second operation comprises transmitting the data in the fourth period by a power of transmitting the data before the second period.

5. The wireless communication method of claim 1, wherein the first power is greater than the first threshold and the second operation comprises stopping transmitting the data in the fourth period,
    wherein the method further comprising:
        sensing a fourth power in the channel in a ninth period, which is after the third period and is within the first period, and
        performing a fifth operation in a tenth period, which is after the ninth period and is within the first period, based on the fourth power,
    wherein a time delay between the third period and the ninth period is configured by an RRC signaling or indicated by DCI,
    wherein:
        the fourth power is greater than the first threshold and the fifth operation comprises:
            stopping transmitting the data in the tenth period,
            sensing a fifth power in the channel in an eleventh period, which is after the tenth period and is within the first period, and
            performing a sixth operation in a twelfth period, which is after the eleventh period and is within the first period, based on the fifth power, or the fourth power is not greater than the first threshold and the fifth operation comprises transmitting the data in the tenth period.

6. The wireless communication method of claim 1, wherein the first period is during which the channel can be occupied by the wireless device for data transmission, within a fixed frame period.

7. The wireless communication method of claim 1, wherein the first period is before a period during which the wireless device is not allowed to transmit data, within a fixed frame period.

8. The wireless communication method of claim 1, wherein the data is for a low priority service,
- wherein a time latency requirement of the low priority service is greater than a time latency requirement of a high priority service,
- wherein a reliability requirement of the low priority service is lower than a reliability requirement of the high priority service,
- wherein a priority level of the low priority service is lower than a priority level of the high priority service,
- wherein the high priority service is associated with ultra-reliable and low latency communications,
- wherein the low priority service is associated with enhanced mobile broadband, and
- wherein the second period overlaps a period during which the wireless device is not allowed to transmit data, which is of a fixed frame period configured for another wireless device, wherein the another wireless device is for the high priority service.

9. A wireless device, comprising:
- a communication unit, configured to transmit data in a first period, and
- at least one processor configured to:
  - perform a first operation in a second period which is within the first period;
  - sense a first power in a channel, in which the data is transmitted, in a third period which is after the second period and within the first period;
  - perform a second operation in a fourth period, which is after the third period and within the first period, based on the first power, wherein the first power is greater than a first threshold and is not greater than a second threshold and the second operation comprises transmitting the data by a reduced transmitting power in the fourth period;
  - sense a second power in the channel in a fifth period, which is after the fourth period and is within the first period; and
  - perform a third operation in a sixth period, which is after the fifth period and is within the first period, based on the second power,
- wherein a time delay between the third period and the fifth period is configured by a radio resource control (RRC) signaling, indicated by downlink control information (DCI) or set as a default value,
- wherein:
  - the second power is greater than the first threshold and is not greater than the second threshold and the third operation comprises:
    - transmitting the data in the sixth period in the reduced transmitting power,
    - sensing a third power in the channel in a seventh period, which is after the sixth period and is within the first period, and
    - performing a fourth operation in an eighth period, which is after the seventh period and is within the first period, based on the third power, or
  - the second power is not greater than the first threshold and the third operation comprises transmitting the data in the sixth period by a power of transmitting the data before the second period.

10. The wireless device of claim 9, wherein the first operation comprises reducing a power of transmitting the data in the second period.

11. The wireless device of claim 9, wherein the first operation comprises stopping transmitting the data in the second period, wherein the data in the second period is delayed or punctured.

12. The wireless device of claim 9, wherein the first power is not greater than the first threshold and the second operation comprises transmitting the data in the fourth period by a power of transmitting the data before the second period.

13. The wireless device of claim 9, wherein the first power is greater than the first threshold and the second operation comprises stopping transmitting the data in the fourth period,
- wherein the at least one processor if further configured to:
  - sense a fourth power in the channel in a ninth period, which is after the third period and is within the first period, and
  - perform a fifth operation in a tenth period, which is after the ninth period and is within the first period, based on the fourth power,
- wherein a time delay between the third period and the ninth period is configured by an RRC signaling or indicated by DCI,
- wherein:
  - the fourth power is greater than the first threshold and the fifth operation comprises:
    - stopping transmitting the data in the tenth period,
    - sensing a fifth power in the channel in an eleventh period, which is after the tenth period and is within the first period, and
    - performing a sixth operation in a twelfth period, which is after the eleventh period and is within the first period, based on the fifth power, or the fourth power is not greater than the first threshold and the fifth operation comprises transmitting the data in the tenth period.

14. The wireless device of claim 9, wherein the first period is during which the channel can be occupied by the wireless device for data transmission, within a fixed frame period.

15. The wireless device of claim 9, wherein the first period is before a period during which the wireless device is not allowed to transmit data, within a fixed frame period.

16. The wireless device of claim 9, wherein the data is for a low priority service,
- wherein a time latency requirement of the low priority service is greater than a time latency requirement of a high priority service,
- wherein a reliability requirement of the low priority service is lower than a reliability requirement of the high priority service,
- wherein a priority level of the low priority service is lower than a priority level of the high priority service,
- wherein the high priority service is associated with ultra-reliable and low latency communications,
- wherein the low priority service is associated with enhanced mobile broadband, and
- wherein the second period overlaps a period during which the wireless device is not allowed to transmit data, which is of a fixed frame period configured for another wireless device, wherein the another wireless device is for the high priority service.

* * * * *